United States Patent
Chen et al.

(10) Patent No.: US 7,358,324 B2
(45) Date of Patent: *Apr. 15, 2008

(54) MANUFACTURING METHOD OF CO-POLYESTER RESINS FOR CLEAR MONO-LAYER CONTAINERS WITH IMPROVED GAS BARRIER CHARACTERISTICS

(75) Inventors: Chi-Chin Chen, Wilmington, NC (US); Peter S. Kezios, Wilmington, NC (US); Helen Codd, Wilmington, NC (US); Karl Buchanan, Kure Beach, NC (US)

(73) Assignee: Dak Americas LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/294,369

(22) Filed: Dec. 6, 2005

(65) Prior Publication Data

US 2007/0129501 A1    Jun. 7, 2007

(51) Int. Cl.
*C08G 69/44*    (2006.01)
*C08G 69/48*    (2006.01)
*C08F 20/00*    (2006.01)
*C08F 20/56*    (2006.01)

(52) U.S. Cl. .................. 528/288; 528/272; 528/36; 525/329.4; 525/419; 525/420; 525/422

(58) Field of Classification Search ............ 528/288, 528/272, 310; 525/329.4, 419, 420, 422
See application file for complete search history.

(56) References Cited

U.S. PATENT DOCUMENTS

| | | | |
|---|---|---|---|
| 4,340,721 | A | 7/1982 | Bonnebat et al. |
| 4,356,142 | A | 10/1982 | Germanio |
| 5,344,912 | A | 9/1994 | Dalgewicz, III et al. |
| 5,346,733 | A | 9/1994 | Dalgewicz, III et al. |
| 5,352,401 | A | 10/1994 | Dalgewicz, III et al. |
| 5,569,991 | A | 10/1996 | Matsuoka et al. |
| 5,597,525 | A | 1/1997 | Koda et al. |
| 5,597,891 | A | 1/1997 | Nelson et al. |
| 5,656,221 | A | 8/1997 | Schumann et al. |
| 5,656,719 | A | 8/1997 | Stibal et al. |
| 5,902,539 | A | 5/1999 | Schmidt et al. |
| 5,939,516 | A | 8/1999 | Greaves et al. |
| 5,945,460 | A | 8/1999 | Ekart et al. |
| 5,945,960 | A | 8/1999 | Luh |
| 5,968,429 | A | 10/1999 | Treece et al. |
| 5,980,797 | A | 11/1999 | Shelby et al. |
| 6,063,495 | A | 5/2000 | Charbonneau et al. |
| 6,090,337 | A | 7/2000 | Slat |
| 6,099,778 | A | 8/2000 | Nelson et al. |
| 6,113,997 | A | 9/2000 | Massey et al. |

(Continued)

OTHER PUBLICATIONS

Claims 1-8 of U.S. Appl. No. 11/249,370.*

(Continued)

*Primary Examiner*—Duc Truong
(74) *Attorney, Agent, or Firm*—Oblon, Spivak, McClelland, Maier & Neustadt, P.C.

(57) ABSTRACT

A process for producing compositions having improved gas barrier properties, and compositions containing a polyester resin and one or more of another thermoplastic resin and a filler, and may be used to form containers that exhibit improved resistance to gas permeation.

17 Claims, 4 Drawing Sheets

U.S. PATENT DOCUMENTS

| | | |
|---|---|---|
| 6,194,536 B1 | 2/2001 | Schmidt et al. |
| 6,274,212 B1 | 8/2001 | Rule et al. |
| 6,319,574 B1 | 11/2001 | Slat |
| 6,392,005 B1 | 5/2002 | Jen |
| 6,395,868 B1 | 5/2002 | Hollingsworth et al. |
| 6,447,711 B1 | 9/2002 | Al Ghatta et al. |
| 6,489,434 B2 | 12/2002 | Jen |
| 6,500,890 B2 | 12/2002 | Edwards et al. |
| 6,559,271 B2 | 5/2003 | Schaaf et al. |
| 6,586,558 B2 | 7/2003 | Schmidt et al. |
| 6,599,596 B2 | 7/2003 | Nichols et al. |
| 6,710,158 B2 | 3/2004 | Edwards et al. |
| 6,762,275 B1 | 7/2004 | Rule et al. |
| 6,783,827 B2 | 8/2004 | Jen |
| 2002/0077405 A1 | 6/2002 | Edwards et al. |
| 2002/0077443 A1 | 6/2002 | Nichols et al. |
| 2002/0077445 A1 | 6/2002 | Nichols et al. |
| 2002/0077449 A1 | 6/2002 | Nichols et al. |
| 2002/0090473 A1 | 7/2002 | Lee et al. |
| 2002/0091226 A1 | 7/2002 | Nichols et al. |
| 2002/0177686 A1 | 11/2002 | Schmidt et al. |
| 2003/0205852 A1 | 11/2003 | Porter |
| 2004/0151973 A1 | 8/2004 | Rock |
| 2004/0228993 A1 | 11/2004 | Weinhold et al. |
| 2005/0029712 A1 | 2/2005 | Nahill et al. |
| 2005/0089712 A1 | 4/2005 | Wang et al. |

OTHER PUBLICATIONS

U.S. Appl. No. 11/294,370, filed Dec. 6, 2005, Kezios et al.
U.S. Appl. No. 11/294,369, filed Dec. 6, 2005, Chen et al.

* cited by examiner

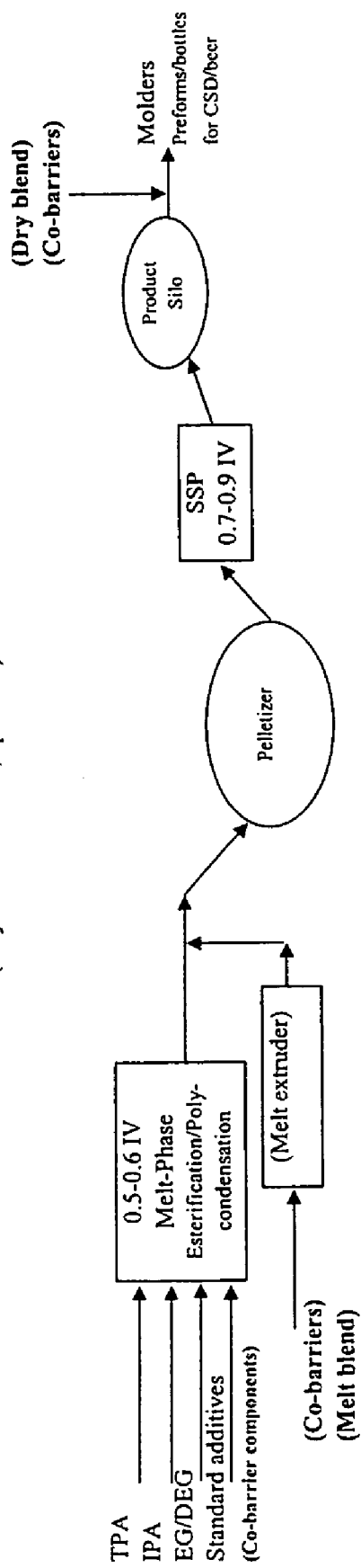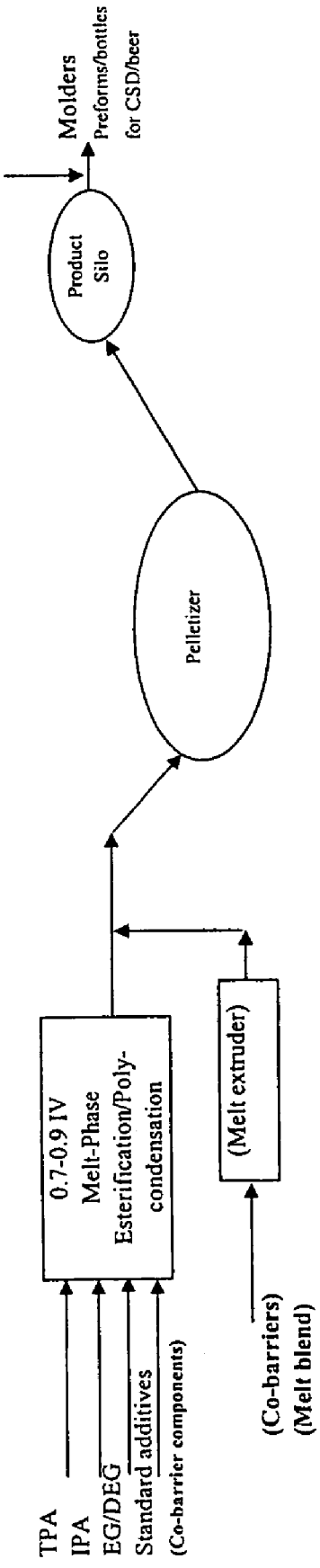

TEM - 2D Micro-graphs @ 34,000X

$CO_2$ permeability versus polymer free-volume

MANUFACTURING METHOD OF CO-POLYESTER RESINS FOR CLEAR MONO-LAYER CONTAINERS WITH IMPROVED GAS BARRIER CHARACTERISTICS

BACKGROUND OF THE INVENTION

1. Field of the Invention

The invention relates to a process for producing compositions having improved gas barrier properties, compositions derived from the process, compositions containing polyester, compositions containing a polyester and a filler, and containers made from the compositions including clear, mono-layer beverage bottles. The invention further relates to polyester compositions, and films derived from the polyester compositions, having improved gas barrier characteristics.

2. Description of the Related Art

Polyester resins including resins such as poly(ethylene terephthalate) (PET), poly(butylene terephthalate) (PBT), poly(ethylene naphthalate) (PEN), poly(trimethylene terephthalate) (PTT), and poly(trimethylene naphthalate) (PTN), are conventionally used as resins in the manufacture of containers such as beverage bottles. Properties such as flexibility, good impact resistance, and transparency, together with good melt processability, permit polyester resins to be widely used for this application.

The starting feedstocks for polyester resins are petroleum derivatives such as ethylene, which is obtained from petroleum or natural gas, and para-xylene, which is typically obtained from petroleum.

Polyester resins are generally made by a combined esterification/polycondensation reaction between monomer units of a diol (e.g., ethylene glycol (EG)) and a dicarboxylic acid (e.g., terephthalic acid (TPA)). The terms carboxylic acid and/or dicarboxylic acid, as used herein, include ester derivatives of the carboxylic acid and dicarboxylic acids. Esters of carboxylic acids and dicarboxylic acids may contain one or more C1-C6 alkyl groups (e.g., methyl, ethyl, propyl, iso-propyl, butyl, iso-butyl, tert-butyl, pentyl, hexyl and mixtures thereof) in the ester unit, for example, dimethyl terephthalate (DMT).

In conventional esterification/polycondensation processes, PET may be formed, for example, by first producing a prepolymer of low molecular weight and low intrinsic viscosity (IV) (e.g., a mixture of oligomers), for example, by reacting a diol and a dicarboxylic acid in a melt phase reaction. The formation of the oligomers may be carried out by reacting a slurry of diol and dicarboxylic acid monomer units in an esterification reactor. EG may be lost to evaporation during the esterification reaction which may be carried out at high temperatures. Therefore the slurry of diol and dicarboxylic acid may contain an excess of EG, for example the diol and dicarboxylic acid may be present in a molar ratio of from about 1.2 to about 2.5 based on the total glycol to total di-acid. Further pre-polycondensation and polycondensation of the oligomers can be carried out to provide a resin mixture having an IV of from 0.50 to 0.62. Such resin mixtures are suitable in various applications such as fibers/filaments, fiber chips, or bottle-resin precursors. Amorphous clear base chips having an IV of from 0.50 to 0.60 may be subjected to solid-state polymerization (SSP) to increase the molecular weight (e.g., to an IV of from 0.74 to 0.76 for water bottle applications, 0.84-0.85 for CSD/beer bottles, etc.). The solid-state polymerization process unit can result in the resin undergoing crystallization which forms opaque pellets.

A continuous polyester (e.g., PET) melt-phase polycondensation process usually consists of three reaction steps: (i) esterification to form low molecular weight oligomers, (ii) pre-polymerization of the oligomers to form a pre-polymer, and (iii) post-polymerization to form a polymer with an intermediate molecular weight or intrinsic viscosity (e.g., a target intrinsic viscosity of from 0.57-0.62).

The three reaction steps (i), (ii), and (iii) above, can be carried out to achieve the target intrinsic viscosity in from 3 to 6 reactors using existing melt-phase process technology. In general, esterification is conducted in one or two vessels to form a mixture of low molecular weight oligomers with a low degree of polymerization (e.g., about up to 7 monomer unit pairs reacted). The oligomers are then pumped to one or two pre-polymerization vessels where higher temperatures and lower pressures aid in removing water and EG. The degree of polymerization then increases to a level of 15 to 20 repeating units. The temperatures are further increased and pressures are further reduced in the final one or two vessels to form a polymer ready to be cut into pellets for example, or to be spun directly into fibers or filaments.

Esterification and pre-polymerization vessels may be agitated. Polycondensation vessels (e.g., finishers, wiped-film reactors etc.) may have agitators designed to generate very thin films. Temperatures and hold-up times are optimized for each set of vessels to minimize the side and degradation reactions. Some by-products that may be generated by the PET melt phase reaction include diethylene glycol (DEG), acetaldehyde, water, cyclic oligomers, carboxyl end groups, vinyl end groups, and anhydride end groups.

Both time and temperature are two variables that are preferably controlled during an esterification/polycondensation reaction. With higher reaction temperatures, the total reaction time is significantly reduced and fewer reactors are needed.

Alternatively to such a continuous production method, polyesters may be prepared using a batch method. In a batch method the diol and dicarboxylic acid units are mixed together in a single reactor. In some cases more than one reactor (e.g., reaction vessel) may be used if necessary. The diol/dicarboxylic acid mixture is heated to cause the monomer units to undergo a condensation reaction. The by-products of the condensation reaction may include water or an alcohol. By conducting the reaction under reduced pressure or by subjecting the reaction mixture to reduced pressure during the final stages of the reaction, volatile by-products of the reaction can be removed thus driving the reaction to completion.

Certain physical and chemical properties of polymeric materials are negatively affected by long exposure to elevated temperature, especially if the exposure is in an oxygen-containing atmosphere or at temperatures above, for example, 250° C. Conventional methods for preparing polyester resins such as PET may suffer from disadvantages associated with the need to carry out an SSP which subjects the resin to a long heat history and/or may require high capital expenditure.

The production of a polyester resin such as PET may be carried out directly from a melt phase of the monomer units without any final solid-state polymerization. For example, a batch process may be carried out at a sufficient temperature, for a sufficient time and at a sufficient pressure to drive the polycondensation reaction to completion thus avoiding the need for any subsequent finishing (e.g., final reaction).

Solid-state polycondensation (SSP) is an important step in some conventional processes used to manufacture high molecular weight PET resins for bottle, food-tray, and tire-cord applications. The clear amorphous pellets (0.57-0.62 IV) produced by the conventional polycondensation reaction processes discussed above may be further polymerized in the solid state at a temperature substantially higher than the polymer glass transition temperature but below the crystalline melting point. The solid state polymerization is carried out in a stream of an inert gas (usually nitrogen under continuous operation) or under a vacuum (usually in a batch rotary vacuum dryer). At an appropriate SSP temperature, the functional end groups of the PET chains are sufficiently mobile and react with one another to further increase the molecular weight.

A conventional process for producing polyester resins for container applications including melt-phase polycondensation and solid state polymerization is shown schematically in FIG. 1 wherein the monomer components of a polyester resin such as PET are mixed in a melt-phase esterification/polycondensation reactor. The reaction is carried out to provide a molten resin having an intrinsic viscosity (IV) of from 0.5 to 0.6. The molten product obtained by the melt-phase esterification/polycondensation is then subjected to a polymer filtration. Optionally a co-barrier resin may be added to the filtered, molten polymer by extruding the co-barrier resin and adding the extrudate to the filtered, molten resin obtained from the melt-phase esterification/polycondensation. The mixed streams, or the polyester stream obtained from polymer filtration may then be pumped into a mixer. A static mixer may be used to ensure that the polyester resin and any co-barrier resin are sufficiently mixed.

The melt-phase esterification/polycondensation is typically carried out in a plurality of reactors. Therefore, the monomers may be added to a first esterification reactor to form a low IV material. As the oligomers pass through the remaining reactors, the IV is subsequently raised as the polycondensation reaction proceeds sequentially through a series of reactors. The material in molten form that is pumped from the static mixer is subjected to solidification and pelletizing. The molten material may be solidified by passage of strands or filaments of the material formed by pumping the material through, for example, a die with a series of orifices. As the molten polyester resin is passed through an orifice, a continuous strand is formed. By passing the strands through water, the strands are immediately cooled to form a solid. Subsequent cutting of the strands provides pellets or chips which, in a conventional process, are then transferred to a solid-state polymerization stage (SSP).

In conventional processes for preparing PET, and even in processes which avoid the use of a solid-state polymerization, after polymerization is complete, the molten polymerized resin is pumped through a die to form multiple strands. The molten resin exiting from the die is quickly quenched in water to harden the PET or polyester resin. As a result of the quick cooling (e.g., water quench) the molten polyester does not have time to crystallize and is solidified in an amorphous state. Solidified PET strands, or pellets derived from cut strands, are clear, transparent and in an amorphous state.

The SSP may include several individual reactors and/or processing stations. For example, the SSP may include a pre-crystallization step wherein the chips and/or pellets are transformed from an amorphous phase into a crystalline phase. The use of a crystalline phase polyester resin is important in later steps of the SSP because the use of amorphous polyester chips may result in clumping of the pellets since an amorphous state polyester resin may not be sufficiently resistant to adherence between pellets and/or chips. The SSP process further includes a crystallizer (e.g., crystallization step), a pre-heater, and an SSP reactor.

Some manufacturing processes do not include an SSP. Processing a polyester resin directly from a melt phase condensation to obtain pre-forms for blow molding applications is described in U.S. Pat. No. 5,968,429 (incorporated herein by reference in its entirety). The polymerization is carried out without an intermediate solidification of the melt phase and permits the continuous production of molded polyester articles (e.g., pre-forms), from a continuous melt phase reaction of the starting monomers.

After pre-crystallization, the chips and/or pellets may be subjected to a final crystallization. A final crystallization may include, for example, proper heating of the chips (pellets, pastilles, granules, round particles, etc.) at appropriate temperatures. Once the polyester resin is in a crystallized state, the pellets and/or chips are preheated and ready for transfer to the top of a counter-flow SSP reactor (parallel to the pre-heater) via a pneumatic system (e.g., Buhler technology). If a tilted crystallizer is stacked above the SSP reactor, the hot/crystallized chips then enter the SSP reactor by its rotating screw of the crystallizer (e.g., Sinco technology). The SSP reactor can be considered as a moving bed of chips that move under the influence of gravity. The chips have a slow down-flow velocity of about 30 mm/minute and the nitrogen has a high up-flow velocity of about 18 m/minute. A typical mass-flow ratio of nitrogen to PET is in the range of 0.4-0.6. In a gravity-flow reactor, the pellets and/or chips are subjected to elevated temperatures for periods of up to 15 hours. The heating and nitrogen sweeping through the gravity-flow reactor will drive the polycondensation reaction and result in longer chain lengths and, concurrently, a higher IV of the resins.

After passing through the gravity-flow reactor, pellets and/or chips having an IV of about 0.84 may be formed. The pellets and/or chips have an opaque characteristic due to their crystallinity. The crystalline material is transferred to a product silo for storage and/or packaging. The finished product in a crystalline state and having a IV of about 0.84, can be further mixed with other co-barrier resins (powders, granules, pellets, pastilles, etc.) by molders or processors who purchase the polyester resins for manufacturing, for example, bottles and/or containers.

Thus, in a conventional process, a melt-phase polycondensation process may be used to make clear amorphous pellets (typically, 0.5-0.6 IV) as precursors to bottle resins. The amorphous pellets are first pre-crystallized, crystallized, and/or preheated, then subjected to SSP in a gravity flow reactor (e.g., a reactor that is not agitated). After crystallization, the resin pellets become opaque and do not stick together if the temperature of SSP is at least 110° C. below the onset of the melting temperature of the resin pellets. In a direct high IV process, only the melt process (no SSP) is used to make a variety of bottle resins (e.g., 0.75 IV for water bottles, 0.85 IV for CSD/beer bottles) as desired. A finisher (e.g., a wiped-film evaporator) may be used to effectively and rapidly remove the reaction by-products such as EG (major), water, acetaldehyde, and so on in direct high IV processes. Immediate removal of EG/water under high temperatures drives the polycondensation reaction equilibrium toward the polymer side.

PET or other polyester resins are known to have hygroscopic behavior (e.g., absorb water from the atmosphere), so pellets obtained by cutting water-quenched strands contain significant quantities of water. Conventionally, the pellets may be dried by passing dry air over the pellets or by heating. Heating for an extended period at an elevated temperature may lead to problems because the amorphous polyester (e.g., PET) pellets may have a tendency to stick to one another.

In preform molding processes, the pellets and/or chips are typically dried before molding. After proper drying, the pellets and/or chips may have a water content of around 50 ppm. The chips and/or pellets are then processed, for example, in the form of pre-forms, by injection molding. Because water is present during the injection molding process which is carried out at elevated temperatures (e.g., temperatures above 200° C.), the IV of the resin may be reduced. The starting chips may be about 0.84 IV. The IV in subsequent injection-molded preforms formed from the starting resin may be about 0.80 IV. Thus, an approximate 5% reduction in IV of about 0.04 units may take place in going from the chips and/or pellets to the pre-form prepared by injection molding when the chips and/or pellets have been properly dried and contain at most about 50 ppm water. Polyester material containing a greater amount of water can undergo thermal and hydrolytic degradation. Excess water in the resin can lead to a substantial reduction in IV of 30% or more.

Conventionally, the pre-form is transformed to a bottle or a container through a blowing operation. The blowing is carried out at a temperature above the glass transition temperature of, for example, 90-110° C. which is substantially lower than the injection molding temperatures to which the pellets and/or chips are exposed during injection molding to form the pre-form. Pre-heating a pre-form is often provided in the form of an infrared heater. Thus the IV of the resin may not change substantially, and preferably does not change at all, during the blow molding process.

An important property of any polymer resin used in food container or beverage container applications is the resin's ability to resist the ingress and egress of gases through the container's walls. Containers for carbonated beverages may be especially susceptible to the egress of gases such as carbon dioxide which is normally present in carbonated soft drinks. Usually, a carbonated soft drink will contain about 4 volumes of dissolved carbon dioxide gas per volume of the liquid carbonated soft drink. Other beverages such as beer typically have approximately 2.8 volumes of total dissolved carbon dioxide.

If the resin material used to form a beverage container permits carbon dioxide to escape, the product delivered to the consumer may be of unacceptable quality (e.g., "flat") if stored too long. In food container applications it is important to resist the ingress of oxygen. Oxygen in contact with a food substance may lead to oxidation and accelerated staleness of the food product.

U.S. Published Application No. 2000/0029712 describes a method that includes the formation of polyester resins directly from a melt phase without any intermediate solid state polymerization. The polymer compositions derived from the process may not exhibit the gas barrier resistance necessary for most modern food and/or beverage container applications. Therefore, a secondary resin layer such as a layer of nylon or an ethylene vinyl alcohol (EVOH) polymer must be used in order to prepare a two layer beverage container of acceptable gas permeation properties.

Some multi-layer food and/or beverage containers may exhibit the required resistance to gas permeation necessary to make the resins acceptable for these applications. There is substantial additional cost and complexity associated with preparing a dual-layer or tri-layer container in comparison to a single-layer container. Such costs are related to the need for additional and more sophisticated processing equipment and technical issues such as delamination between the layers making up the inner and outer surfaces of the container.

Thus, there is a need for a process that combines the advantages of a continuous production process for forming a pre-form for blow molding directly from a melt phase resin obtained by melt condensation (without the need for an intermediate SSP step), with the ability to obtain a resin from that process that may be used to form a single-layer container that exhibits improved resistance to gas permeation.

SUMMARY OF THE INVENTION

Accordingly, one object of the invention is to provide a resin that exhibits improved gas barrier resistance. In one embodiment of the invention this object is achieved by preparing polymeric resins directly from melt-phase esterification/polycondensation without subsequent solid-state polymerization to provide a resin material having intrinsic viscosity and mechanical characteristics desirable for food and beverage container applications. In another embodiment the gas barrier resistance is further improved by mixing the resins with one or more additives such as fillers and/or other resins to provide further improved resistance to gas permeation. In still a further embodiment of the invention, a conventional SSP process is used to prepare a resin composition containing one or more additional resins and having improved gas barrier properties.

Another object of the invention is to provide containers having improved gas barrier resistance. In one embodiment, this object is achieved with compositions comprising the resin of the invention. The compositions are used to prepare pre-forms and/or bottles and/or containers for food and/or carbonated beverage applications where increased resistance to gas permeation is desirable.

Another object of the invention is to improve gas barrier resistance in compositions containing resins. In one embodiment this object is achieved with resin compositions that include a polyester matrix resin that has a small amount of IPA in the polymer structure and further contains a co-barrier resin. Another embodiment achieves this object with a composition comprising a polyester resin containing a relatively higher amount of polymerized IPA and a lower amount of a co-barrier resin.

Another object of the invention is to provide improved gas barrier resistance in a resin having certain viscosity characteristics. In one embodiment this object is achieved with resins having intrinsic viscosity within a range of 0.8 to 0.9 and having certain crystallinity characteristics to thereby provide improved gas barrier resistance when used in thin-walled applications such as carbonated soft drink bottles.

Another object of the invention is to provide improved gas barrier resistance in a resin with certain polymer structure. In one embodiment this object is achieved with polyester resins having certain col-linearity properties.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a schematic of a conventional melt-phase process with subsequent solid-state polymerization that may be used in the preparation of some embodiments of the invention;

FIG. 2 shows a schematic of one embodiment of the process described herein;

DETAILED DESCRIPTION OF THE PREFERRED EMBODIMENTS

Figure 3:
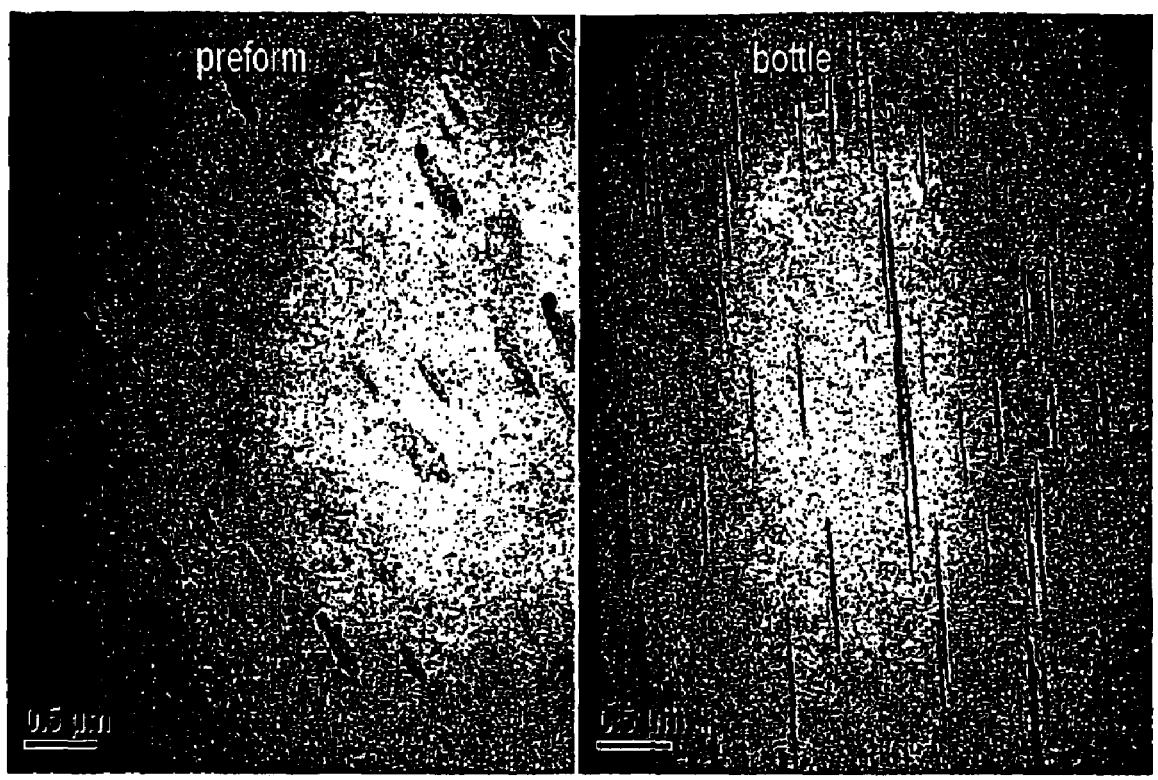
FIG. 3 shows a transmission electron micrograph of a blend of materials.

One aspect of the invention includes a method for forming a composition containing at least one of a polyester, a co-polyester, a blend of polyesters, and a blend of copolyesters, having improved gas barrier properties by melt-phase polycondensation without any solid-state polymerization.

In another aspect, the invention compositions may comprise the above-mentioned compositions and/or blends are mixed with one or more additives to provide resin compositions that may be used to form preforms or may be used to form containers exhibiting improved gas barrier resistance. In this aspect of the invention, a conventional SSP process may be used to form a matrix resin that is mixed with one or more other resins. The compositions are included as an embodiment of the invention.

The gas barrier resistance of resins used to manufacture PET-based bottles may be improved by 100% or greater if the polyester resin is oriented. For carbon dioxide gas and oxygen gas, an oriented PET bottle has a gas barrier resistance of at least two times (2×) as great as or more than an unoriented PET bottle. During the blow molding process, a preform may be pre-heated by infrared (IR) heaters to a temperature of approximately 90-100° C. This may be followed by stretching in the axial direction and blowing. This pre-heating temperature is slightly above the glass transition temperature of standard or modified PET bottle resins.

The process of biaxial orientation provides for generation of stress-induced lamellar crystals. The oriented crystallites result in lower gas permeability and enhanced mechanical properties. A biaxially-oriented PET bottle typically has a crystallinity of 20-30% (21% in the shoulder, 25% in middle panel, 25% in the foot), which is based on the densities as measured in a density gradient column. Alternatively, a PET may be modified with a co-barrier resin that is known to have greater gas barrier resistance than PET. For example, meta-xylene diamine (MXDA)-based polymers such as MXD6, MXD6-IPA, MXD6-phthalic anhydride etc. may have better gas barrier properties than PET. Such MXDA-containing polymers may also have better gas resistance than certain nylons such as nylon 6, nylon 6/6 etc. MXD6 is a semi-crystalline polyamide resin that may be produced by the polycondensation of MXDA with adipic acid. Processes for producing such MXDA-containing polymers are described, for example, in U.S. Pat. Nos. 4,433,136 and 4,438,257 each of which is incorporated herein by reference in its entirety.

It is not fully understood why oriented PET resins provide better gas barrier resistance. It is possible that the presence of ortho- or meta-phenyl rings in the polymer chains prevent their flipping in the solid state and thus the resin matrix overall exhibits a lower permeability. In such co-barrier containing resin matrices, however, it may be difficult to obtain desirable color and/or light transmittance properties.

In another aspect of the invention, a direct high IV polyester or PET resin is obtained without solid-state polymerization. Preferably, the target resin in the molten state is pumped, directly from a finisher (e.g., a wiped-film evaporator), through a die and is subsequently pelletized with or without cooling with water.

In one embodiment, the resulting resin may be cut at temperatures higher than the glass transition temperature of the resin. Preferably the strands are cut at temperatures that are 10, 15, 20, 30, 40, 50 or 100° C. greater than the glass transition temperature of the resin. The chips are preferably separated from the water as quickly as possible. The temperature at the exterior of the pellets may be lower than the temperature inside the pellets. The chips and/or pellets may continue to crystallize via their inside residual heat (e.g., latent heat crystallization). A chip vibrator may be used to prevent the chips from sticking together during cooling and/or crystallization.

Water cooling conditions may be an important factor in some embodiments of the invention. In a case where the resin (e.g., resin chips) is further treated in an SSP, it is advantageous that the chips do not stick together during the SSP treatment. One way to reduce the tendency of chips to stick together is by imparting greater or more robust crystallinity to the chips and/or pellets formed during cooling and/or cutting. This may especially be the case if the resin contains more than one type of polymer.

Resins such as resins that contain an MXDA co-resin may be more prone to sticking or clumping when heated (e.g., when heated above the glass transition temperature or close to the glass transition temperature). Preferably such resins and/or resin mixtures are cooled so that a latent crystallization process takes place. The pellets/chips thus formed are less prone to sticking, even when subjected to SSP treatment.

Resin compositions may also be cooled/crystallized in a manner that provides an amorphous chip and/or pellet. Cold cooling, with or without cutting, may provide chips and/or pellets that are amorphous.

One embodiment of the invention includes reacting monomer units of a diol and a dicarboxylic acid to form a polyester having the reacted monomer units present in an equimolar or nearly equimolar quantity. In a preferred embodiment the diol and the dicarboxylic acid material are reacted to form a polymer having the monomer units present in approximately equimolar quantities. The diol and the dicarboxylic acid may be reacted in amounts that are not exactly equimolar in quantity. For example, the diol may be present in greater quantities than the dicarboxylic acid. During the polycondensation reaction, the excess diol is typically then removed under heat at reduced pressure. Suitable polyesters useful in the compositions of the invention are well known in the art and are generally formed from repeat units comprising one or more carboxylic acid components selected from terephthalic acid (TPA), isophthalic acid, naphthalenedicarboxylic acid, dimethyl-2,6-naphthalenedicarboxylate (NDC), hydrolyzed 2,6-naphthalenedicarboxylic acid (HNDA), and one or more diol components selected from ethylene glycol, diethylene glycol, 1,4-cyclohexane-dimethanol, 1,3-propanediol, 1,4-butanediol, propylene glycol (1,2-propanediol), 2-methyl-1,3-propanediol, and 2,2-dimethyl-1,3-propanediol (neopentyl glycol) and mixtures thereof. Preferred polyesters of the present invention include poly(ethylene terephthalate) (PET), poly(ethylene naphthalate) (PEN), poly(ethylene isophthalate) (PEI), and poly(trimethylene terephthalate) (PTT), poly(trimethylene naphthalate) (PTN), most preferably poly(ethylene terephthalate) (PET).

The polyesters of the present invention can be made using processes well known to skilled artisans. Suitable polyesters can be produced in a conventional manner by the reaction of a dicarboxylic acid having 2 to 40 carbon atoms with one or more polyhydric alcohols such as glycols, diols or polyols, containing from 2 to about 20 carbon atoms, preferably from 6 to 12 carbon atoms. The general conditions producing polyesters, including process conditions, catalysts, and additives are known to skilled artisans. Methods of producing polyester materials and combinations of polyesters with other polymeric materials are given in W. R. Sorenson and T. W. Campbell, "Preparative Methods of Polymer Chemistry," (Interscience Publishers, New York 1968, and subsequent editions) and the "Encyclopedia of Polymer Science; and Engineering, 2nd Ed.," H. F. Mark et al., (John Wiley & Sons, New York 1985), particularly Volume 12, (pages 1-290 (polyesters generally) and especially pages 259-274 for resin manufacturing processes, each of which is incorporated herein by reference.

The dicarboxylic acid that may be used to make the invention polyester-containing compositions includes alkyl dicarboxylic acids having 2 to 20 carbon atoms preferably from 6 to 12 carbon atoms, and an aryl- or alkyl-substituted aryl dicarboxylic acids containing from 8 to 24 carbon atoms, preferably from 8 to 16 carbon atoms. Additionally, alkyl dicarboxylic acid diesters having from 4 to 20 carbon atoms or alkyl-substituted aryl dicarboxylic acid diesters having from 10 to 20 carbon atoms can be utilized.

The dicarboxylic acid component of the invention polyester may optionally be modified with up to about 30 mole percent, preferably up to about 25 mol percent, more preferably about 20 mol percent of one or more different dicarboxylic acids. In another embodiment of the invention the polyester is modified with less than 10 mol %, preferably less than 8 mol %, most preferably from 3 to 6 mol % of one or more different dicarboxylic acids. Such additional dicarboxylic acids include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acids to be included with terephthalic acid in the invention resin composition in major or minor proportions include: phthalic acid, isophthalic acid, 5-(sodiosulfo)-isophthalic acid (5-Na$^+$SO$_3$-IPA), 5-(lithiosulfo)-isophthalic acid (5-Li$^+$SO$_3^-$-IPA), naphthalene-2,6-dicarboxylic acid (and also the 1,4-, 1,5-, 2,7-, and 1,2-, 1,3-, 1,6-, 1,7-, 1,8-, 2,3-, 2,4-, 2,5-, 2,8-isomers), cyclohexanedicarboxylic acid, cyclohexanediacetic acid, diphenyl-4,4'-dicarboxylic acid, succinic acid, glutaric acid, adipic acid, azelaic acid, sebacic acid, bibenzoic, hexahydrophthalic, bis-p-carboxy-phenoxyethane, and mixtures thereof and the like. Preferred dicarboxylic acids include isophthalic and terephthalic acids.

In a preferred embodiment of the invention the polyester matrix resin comprises from 5 to 30 mol % of isophthalic acid and from 1 to 15 mol % of a naphthalene dicarboxylic acid, more preferably from 2 to 10 mol % of the naphthalene dicarboxylic acid, even more preferably from 4 to 8 mol % of the naphthalene dicarboxylic acid, in the form of reacted monomer units.

Terephthalate polyesters for clear container applications are typically made from either a terephthalic acid and ethylene glycol, or from a terephthalic acid and a 1,4-cyclohexane diol. Suitable dicarboxylic acids include terephthalic acid, isophthalic acid, malonic, succinic, glutaric, adipic, suberic, sebacic, maleic and fumaric acid, all of which are well known dicarboxylic acids, or mixtures of these such that a copolyester is produced.

Polyhydric glycols or diols containing from 2 to 8 carbon atoms are preferred, most preferably ethylene glycol. Glycol ethers or diol ethers having from 4 to 12 carbon atoms may be substituted for the glycol or diol. Suitable glycols, in addition to ethylene glycol and 1,4-cyclohexanedimethanol (CHDM), include diethylene glycol, propylene glycol (1,2-propane diol), 1,3-propanediol, 2-methyl-1,3-propanediol, 2,2-dimethyl-1,3-propanediol (neopentyl glycol), 1,2-butanediol, 1,4-butanediol, pentaerythritol, similar glycols and diols, and mixtures thereof. These compounds and the processes for making polyesters and copolyesters using the compounds are all well known in the art.

In addition, the glycol component may optionally be modified with up to about 15 mole percent, preferably up to about 10 mol percent, more preferably about 5 mol percent of one or more different diols other than ethylene glycol. Such additional diols include cycloaliphatic diols preferably having 6 to 20 carbon atoms or aliphatic diols preferably having 3 to 20 carbon atoms. Examples of such diols include: diethylene glycol, triethylene glycol, propylene glycol, 1,4-cyclohexanedimethanol, propane-1,3-diol, butane-1,4-diol, pentane-1,5-diol, hexane-1,6-diol, hexane-1,4-diol, 1,4-cyclohexanedimethanol, 3-methylpentanediol-(2,4), 2-methylpentanediol-(1,4), 2,2,4-trimethylpentanediol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetra-methyl-cyclobutane, 2,2-bis-(3-hydroxyethoxyphenyl)-propane, neopentyl glycol, 2,2-bis-(4-hydroxypropoxyphenyl)-propane, mixtures thereof and the like. Polyesters may be prepared from two or more of the above diols.

The polyester may also contain small amounts of trifunctional or tetrafunctional comonomers such as trimellitic anhydride, trimethylolpropane, pyromellitic dianhydride, pentaerythritol, and other polyester forming polyacids or polyols generally known in the art.

The polyester resins described herein may contain one or more other elements or components conventionally used in the manufacture of polyester resins. For example, a typical resin may contain elements such as Co, Sb and/or P that may be present in the resin compositions due to their use and/or presence in the catalysts, heat stabilizers, and colorants used during the polymerization and/or processing of polyester resins. For example, Sb, Ge, Ti, or Sn may be used for the melt polymerization, for example, in the form of organic titanates, dibutyl tin dilaurate, tin organics, germanium dioxide, antimony trioxide (Sb$_2$O$_3$), antimony triacetate, and/or antimony glycolate (Sb$_2$(gly)$_3$) or oxides of the respective metals (e.g., TiO$_2$, GeO$_2$ etc.). Phosphorous may be present as a residue from any trialkyl phosphate or phosphite present during the polymerization and/or processing of the resulting resins. Elements that are present as residues from coloring agents used, for example, to modify and/or control yellowness index such as Co(OAc)$_2$ may also be present. Typically the materials that are present as residues from polymerization catalysts or processing additives are present in an amount of 10-1,000 ppm, preferably 50-500 ppm.

Also, although not required, other additives normally used in polyesters and/or other thermal plastic compositions, may be present in the invention resin composition. Such additives may include, but are not limited to, colorants, toners, pigments, carbon black, glass fibers, fillers, impact modifiers, antioxidants, stabilizers, flame retardants, reheat aides, acetaldehyde-reducing compounds, oxygen scavengers, barrier enhancing aides and mixtures thereof. Antiblock agents may also be present together with other lubricants.

In a preferred embodiment of the invention the process includes reacting equimolar quantities of an ethylene glycol and a phthalic-based acid under conditions whereby the phthalic-based acid is molten.

The reaction may be conducted on a mixture of monomer units that includes one or more diols and one or more aromatic dicarboxylic acids or esters thereof.

The process of forming the polymeric compositions of the invention in a manner that excludes solid state polymerization includes the methods described in U.S. Published Application Nos. 2005/0029712 and 2005/0161863; and U.S. Pat. Nos. 5,980,797; 5,968,429; 5,945,460; and 5,656,719 (each of which is incorporated herein by reference in its entirety). In some of the embodiments described herein that include polyester compositions that are defined by their physical and chemical properties such as intrinsic viscosity, crystallinity, clarity, etc., conventional processes such as the process described in FIG. 1 may be used to form the polyester or co-polyamide.

The molten polymeric material may be mixed with one or more other molten polymeric streams containing polymeric polyester materials made from the same monomer units or different monomer units to form a mixture of molten polymeric material (e.g., a blend of polyester materials). In a preferred embodiment the resulting polymer composition is mixed with one or more additives while molten and then used in the formation of preform articles.

As the melt-phase polymerization reaches a target IV, the molten polyester (e.g., PET, PEN, etc.) is pumped in the molten state through a die. The resin may be pelletized using any conventional method including any one of the methods described below. In conventional melt polycondensation processes for preparing polyester compositions such as PET compositions or PET-containing compositions, the molten polyester is completely quenched for clear/amorphous particles. In one embodiment of the invention, the resulting resin (e.g., after passage of the molten resin through a die) can be treated by any conventional method. For example, dry/cold pelletized can be carried out whereby the clear/amorphous molten resin is rapidly quenched in a water bath. The water of the quenched resin is first blown away and then the resin is pelletized.

In another embodiment of the invention, wet/cold pelletizing may be used. A wet/cold pelletizing process may use a partially underwater pelletizer. The rapid quenching process may be carried out by continuously spraying molten falling strands of the resin with cold water. The wet/cold strands are then pelletized by a rotating cutter, which may be partially in the water.

In another embodiment of the invention, wet/hot pelletizing may be used. As molten resin exits from the holes of a die they may be immediately cut while hot. Hot cutting is preferably carried out above the glass transition temperature of the resin and typically provides spheroidal particles.

In a preferred embodiment of the invention, the molten polyester composition is partially cooled to solidify the composition. The temperature to which the polyester compositions are partially cooled is between the glass transition temperature (Tg) and the melting point of the polyester resins. The polymer composition is then maintained at a temperature of 165±50° C., preferably ±40° C., more preferably ±25° C., even more preferably ±15° C. for PET crystallization by separating the hot chips from the water as quickly as possible. Separation of the solidified polyester composition from, for example, a water bath, may be facilitated with a centrifugal drier, a vibrating plate and/or a vibrating screener, such as those available from Rieter, BKG and Gala Industries. The residual heat of the chips can be used for in-situ crystallization without a conventional crystallizer. Preferably, this aspect of the invention is carried out on a PET resin.

After polymerization, the resulting polymer melt may be used to form pre-forms, for example for blow molding, directly from the melt without any intermediate solidification of the polymeric material and without a solid state polymerization. The molten polymeric material may be used directly in a blow-molding, injection molding, or sheet molding application to form a final formed product such as a bottle, container, other molded article, or sheet stock.

FIG. 2 provides a high view schematic diagram that encompasses one or more embodiments of the inventive process for making certain polyester resin compositions. The inventive process begins by reacting monomer units including a dicarboxylic acid and a diol in the presence of standard additives including one or more antioxidants with heat stabilizers in a melt-phase reaction.

The melt-phase reaction may be carried out in a plurality of reactors that are connected in series, in parallel, or in both series and parallel. The reaction of the dicarboxylic acid and diol monomers is carried out in the absence of any solvent (e.g., a diluent component that does not form a substantial portion of the reacted polymer units in the resin composition). The monomer units are reacted to form a material having an intrinsic viscosity that may preferably range in one embodiment of the invention from 0.5 to 0.6. The molten material thus formed in the melt-phase reactor is then pumped or transferred to a finishing reactor. The finishing reactor may be a reactor such as a wiped-film reactor which provides substantial contact between surface areas of the reactor and results in high mixing of the molten reacted melt-phase product. The finisher may be carried out in one or more reactors connected in series, parallel, or both in series and parallel. In addition to the wiped-film reactor, one or more pipe reactors may be included. The resin product obtained from the last finishing reactor may have an intrinsic viscosity of from 0.7 to 0.9, preferably about 0.75 to 0.85, more preferably, 0.80 to 0.85.

The molten resin product obtained from the finishing reactor is then preferably subjected to a polymer filtration in the molten form. Polymer filtration may be carried out in one or more steps.

For example, after the resin material from the last finishing reactor is filtered, one or more co-barrier resins may be mixed with the molten, filtered polyester resin composition. In one embodiment of the invention, a co-barrier resin is melt extruded and then mixed with the molten polyester resin composition that is filtered and in molten form. The mixed streams obtained from the melted co-barrier resin and the filtered polyester resin composition may be directed to a static mixer for mixing. After mixing, preferably continuous mixing, the molten, mixed material is directed to a pelletizer to solidify the mixed polyester resin composition. For example, the mixed polyester resin composition may be pumped through a die containing a series of orifices. The molten material exiting the orifices is pelletized. As the resin enters the water of the underwater pelletizer, it slowly solidifies. The water of the underwater pelletizer may be maintained at a high temperature. Preferably, the water of the underwater pelletizer is maintained at a temperature of above 50° C., preferably above 80° C., even more preferably above 90° C. Preferably, the hot water of the underwater pelletizer is maintained at a temperature that is above the glass transition temperature of the polyester resin composition and below the melting point of the polyester resin composition. In another embodiment of the invention, to avoid latent heat crystallization, the water temperature is preferably below 80° C., preferably below 60° C., more preferably below 50° C.

By carrying out solidification of the molten, mixed polyester resin composition with hot water and cutting, the process of one embodiment of the invention provides pellets and/or chips of solid polyester resin composition that is in the crystalline phase. Because the pellets and/or chips are in the crystalline phase, they appear opaque.

The resulting solid, opaque, crystalline polyester resin composition may then be transferred to a product silo for intermediate storage or for packaging. The thus obtained product may be mixed with co-barrier resin in solid form, for example as a pellet or powder, to form a mixture of pellets and/or chips of the invention polyester resin composition and a solid form co-barrier resin. The resulting composition may then be used for injection molding operations, including the formation of pre-forms for blow molding articles such as containers and bottles.

In comparison to the conventional melt-phase process described in FIG. 1 above, the invention process avoids the necessity for carrying out process steps such as pre-crystallization and SSP. Thus, the invention process provides a method for making a solid polyester resin composition in crystalline form that avoids much of the equipment needed for the conventional processes. Thus, whereas the conventional process may require specialized equipment for pre-crystallization and SSP, the invention process avoids these steps and additionally avoids the substantial heat history associated with carrying out such process steps.

The intrinsic viscosity of the matrix resin (e.g., the PET matrix resin) may be lower in the preform than the intrinsic viscosity of the resin from which the preform is molded. This may occur for a number of reasons. For example, the addition of a co-barrier resin having a lower intrinsic viscosity may effect, e.g., raise or lower, the intrinsic viscosity of the final composition which may be a mixture of the matrix resin and the co-barrier resin. Further, after a step of processing to prepare a pre-form, it is possible that the heat history thereby incurred may result in a slight decomposition or depolymerization of the matrix resin thereby lowering the intrinsic viscosity. Therefore the intrinsic viscosity of the resin in a preform may be about 0.05 units less than the intrinsic viscosity of the matrix resin, the viscosity of the resin in a preform may alternatively be 0.04, 0.03, 0.02 or 0.01 units lower than the intrinsic viscosity of the base polyester resin (e.g., PET matrix resin).

For the PET matrix resin the polymerization of the monomer units is preferably carried out to provide a target intrinsic viscosity of from 0.7 to 0.90, preferably from 0.75 to 0.85, most preferably the intrinsic viscosity is 0.80 to 0.85. For the co-barrier resin the IV is in a similar range to that of the PET matrix, preferably the co-barrier resin has an IV that is ±0.05, more preferably ±0.03, the IV of the matrix resin.

The measurement method for determining solution intrinsic viscosity (IV) of polyester (PET) resins is conventionally known. Solution IV can be measured at 0.50% concentration of the resin in a 60/40 (wt. %/wt. %) phenol/1,1,2,2-tetrachloroethane solution by means of a glass capillary viscometer. Conditions for measuring solution IV are described in ASTM D 4603 (incorporated herein by reference in its entirety). The solution IV of the co-barrier resins described herein can also be measured the same method used to determine solution IV for PET resins.

In a further embodiment of the invention the polymeric compositions of the invention contain one or more additives such as fillers. Fillers may include materials such as clays or other polymeric materials, e.g., nylon.

The PET compositions of the invention preferably contain a PET resin that contains copolymerized IPA monomer units. The invention encompasses at least a low-IPA and a high-IPA PET resin. For example, a low-IPA composition (i) which contains a PET resin having an amount of IPA monomer units of up to 6% by mol. In a preferred embodiment the low-EPA PET resin contains up to 5 mol % of IPA monomer units. Most preferably, the low-EPA PET resin contains from 2-4 mol % of polymerized IPA monomer units based upon the total number of moles dicarboxylic acid monomer units. Hereinafter the PET resin containing a low amount of IPA monomer units is referred to as the low-IPA PET resin.

Another PET resin is a high-IPA PET resin, for example (ii) high-IPA PET resin wherein IPA monomer units are present in an amount of from 10-30 mol %, preferably from 15-28%, more preferably from 20-25% and most preferably about 25% by mol based on the total number of moles of dicarboxylic acids in the PET polymer. Other ranges include 10-28%, 12-30%, and all ranges and sub-ranges appearing between and any of 14%, 16%, 18%, 20%, 22%, 24%, and 26% and/or the above stated ranges.

Thus, in preferred embodiments, the PET compositions of the invention may include a PET matrix resin such as the low-IPA resin or the high-IPA resin described above together with one or more additives such as an inorganic filler or a co-barrier resin. Preferably a composition comprising the low-EPA resin contains from 2-8% by weight of a co-barrier resin, where % by weight is based on the total weight of the composition. More preferably, the co-barrier resin is present in the low-EPA PET matrix resin in an amount of from 3-6% by weight, and even more preferably the co-barrier resin is present in an amount of from 4-5% by weight.

In another preferred embodiment, the PET composition of the invention contains the high-IPA resin as a matrix and a co-barrier resin. The co-barrier resin is preferably present in the matrix of the high-IPA PET resin in an amount of up to 1% by weight, preferably less than 1% by weight, more preferably up to 0.5% by weight and most preferably less than 0.4% by weight where percent by weight is based on the total weight of the composition.

In a preferred embodiment the polymeric polyester composition contains a solid clay filler. The clay filler is preferably in the form of an expanded clay or expanded mica. Examples of expanded clays and/or micas include organoclays. Some organo clay materials are preferred. Organoclays such as CLOISITE 93A, CLOISITE 30B, and other CLOISITE products from Southern Clay Products, Gonzalez, Tex. show excellent exfoliation in an MXD6 (6001 or 6007) resin matrix. The dosage of 30B or 93A organoclays may be about 4 wt. %. Other ranges that the filler may be present include 1-10 wt. %, 2-8 wt. %, and 4-6 wt. %. Preferably, the organoclay is present in a matrix containing an MXD6-containing resin and the organoclay is present in an amount of 4% relative to the total MXD6 resins. The filler may be present on other amounts such as from 1 to 20% by weight, 2 to 15% by weight, 3 to 10% by weight and 6 to 8% by weight. Mixtures of the organoclay with an amine-containing resin may be melt blended with PET resins compositions to obtain a composition comprising a matrix resin, an organoclay filler and a co-barrier resin. This is one promising approach for nano-plates to be indirectly dispersed in a PET resin matrix.

Preferably the organoclay materials are organically modified nanometer scale layered magnesium aluminum silicate platelets. Typically the organically modified organoclays are derived from platelets that are about 1 nanometer thick and from 70-150 nanometers across. The process of organically modifying the platelets includes contacting the platelets with organic chemicals such as quaternary ammonium salts. For example nanoparticle clays contacted with quaternary ammonium salts such as dimethyl benzyl hydrogenated tallow quaternary ammonium salt (2MBHT), methyl bis(2-hydroxyethyl) tallow quaternary ammonium salt (MT2EtOH), and methyl dihydrogenated tallow ammonium (M2HT) are preferred. Particle sizes may be about 6 micron but any particle size that permits homogeneous inclusion of the particles in the matrix and/or co-barrier resin may be used.

In a preferred embodiment the organoclay is first dispersed in a co-barrier resin such as an MXDA-copolyamide such as one containing IPA and terephthalic acid together with an amount of ethylene glycol or other diol and MXDA (meta-xylene diamine). By first dispersing the inorganic filler such as organoclay filler in the co-barrier resin (e.g., in an MXDA-copolyamide resin) the inorganic filler may be better dispersed in the polyester matrix resin (e.g., the PET matrix resin).

The inorganic filler may be dispersed in the co-barrier resin in the solid state by mixing powders of the inorganic filler and the co-barrier resin. The mixture of powders may then be mixed directly with the molten matrix resin or, may be mixed with a molten resin after first melting the mixture of the co-barrier resin and inorganic filler.

In one embodiment a co-barrier/inorganic filler master batch is prepared. The inorganic filler is mixed with molten co-barrier resin to form pellets and/or strands of a master batch which contains the co-barrier resin as a matrix resin and, dispersed therein, the inorganic filler. The inorganic filler may be present in an amount of up to 25% by weight based on the entire weight of the co-barrier/inorganic filler master batch. Preferably, the inorganic filler is present in an amount of up to 20%, more preferably in an amount of up to 15%, in a further preferred embodiment the inorganic filler is present in the co-barrier/inorganic filler master batch mixture and/or resin in an amount of up to 10% by weight, more preferably from 1-5% by weight.

The inorganic filler may be present in an amount of 0.05 to 2.0% by weight based on the total weight of the composition. More preferably, the inorganic filler is present in an amount of 0.1 to 2.0% by weight, even more preferably from 0.5 to 1.5% by weight and most preferably the inorganic filler is present in an amount of about 1% by weight.

In another preferred embodiment the polymeric polyester composition (e.g., PET composition) is mixed with a polymer filler such as a powdered amide-based polymer (e.g., nylon) or other thermoplastic materials. The resins of the invention (e.g., polyester resin compositions) may contain one or more polyamides or thermoplastics. Any polyamide may be present in the invention compositions including, for example: poly(m-xylene adipamide), poly(hexamethylene adipamide), polycaprolactam, poly(hexamethylene isophthalamide), and poly(hexamethylene isophthalamide-co-terephthalamide). Polyamides that are co-polymers of, for example, a polyester may also be present. Any polyamide/polyester co-polymer may be present in the invention composition including: polyamides that include polymerized units of isophthalic acid, terephthalic acid, cyclohexanedicarboxylic acid, meta-xylenediamine, para-xylenediamine, 1,3- or 1,4-cyclohexane(bis)methylene, one or more aliphatic acids with 6-12 carbon atoms, aliphatic aminoacids with 6-12 carbon atoms, lactams with 6-12 carbon atoms, aliphatic diamines with 4-12 carbon atoms. Polyamide dendrimers may be present including polyamide dendrimers that contain polymerized dicarboxylic acids. Preferred polyamides are poly(m-xylylene adipamide), poly(hexamethylene adipamide), polycaprolactam, poly(hexamethyleneisophthalamide, poly(hexamethyleneadipamide-co-isophthalamide), poly(hexamethyleneadipamide-co-terephthalamide). Especially preferred is MXD6 which is a polymer of meta-xylylenediamine and adipic acid. Also preferred are copolymers of MXD6 with a phthalic acid. Blends of MXD6 with one or more polyester resins such as polyethylene terephthalate and/or polyethylene terephthalate resins modified with meta-xylylenediamine. The polymer filler may be present in amounts of from 1-20%, 2-18%, 4-16%, 5-15%, 6-12%, 8-11% and any range or sub-range between the stated values, based on the total weight of the resins.

Preferred resin compositions of the invention include blends or mixtures of PET with at least one of a polyamide, such as MXD6, or a MXD6 polymer wherein up to 25% of the adipic acid monomer units are replaced with a dicarboxylic acid such as isophthalic acid. In place of the copolymer a blend of PET with a different polyester such as polyethylene naphthalate (PEN) may be used.

An organic filler may preferably be present in an amount of up to 10% by weight. More preferably the organic filler is present in an amount of from 1 to 8% by weight. Even more preferably the organic filler is present in an amount of from 3 to 6% by weight based on the total weight of the composition. Most preferably the organic filler is present in an amount of about 5% by weight.

In a particularly preferred embodiment of the invention improved gas barrier resistance is obtained in polyester compositions wherein the polyester matrix resin comprises a polymer that has a structure with a non-collinear arrangement of dicarboxyl functional groups, dihydroxyl functional groups, or diamines bonded to a phenyl ring. In addition to polyesters, such improved gas barrier resistance may also be observed in polyamides or polyesteramides. In the case of polyester-containing polymers the dicarboxyl functional groups bonded to a phenyl ring may be derived from groups such as isophthalic acid, 1,3-phenyldioxydiacetic acid, phthalic anhydride, 2,6-naphthalene dicarboxylic acid, etc. For polymers containing dihydroxy functional groups in polymers exhibiting the non-collinear arrangement may be, for example, 1,3-bis(2-hydroxyethoxy)benzene, etc. Dienes which may be bonded to a phenyl unit and which may exhibit the non-collinear arrangement of functional groups include dienes such as 1,3-metaxylene diamine (MXDA), etc.

The non-collinear arrangement (meta and ortho isomers) of functional groups (di-acids, di-ols, or di-amines) directly or indirectly bonded to the phenyl ring may be observed and/or confirmed by use of chain conformations. In the naphthalene ring, the carbonyl carbons to $C_2$ and $C_6$ bonds are parallel but not collinear. The naphthalene rings may not be flipped by equal and opposite counter-rotations.

The NMR techniques of $^{13}C$, $^{1}H$, and/or $^{2}H$ (deuterated) may be used to identify collinear and non-collinear chain conformations in the solid state. In MXDA-based nylons, the barrier improvement comes from lower fractional free-volume, hydrogen bonding as an intermolecular force for closer chain alignment, and non-collinear chain fragments. The co-barrier resin which may be a component of one or more embodiments of the invention polyester compositions may be made in a polymerization process that permits the isolation of a color stable, low yellowness index, material. For example, an MXD6-IPA resin may be formed by reacting, in the melt phase, any one of the polyester monomers described herein (e.g., terephthalic acid), a diol (e.g., ethylene glycol), and a low amount of IPA (e.g., up to 6 mol % based on the total number of mols of dicarboxylic acid) or a high amount of IPA (e.g., about 25 mol % of IPA based on the total mols of dicarboxylic acid). The polymerization is carried out by mixing all of the dicarboxylic acid monomers, the glycol monomer, and a diamine such as MXDA. Preferably the melt phase polymerizations used to form, for example, an MXD6-IPA polyester resin, are carried out by including a hindered phenolic antioxidant in the mixture of monomers during the polymerization steps. Alternatively, a heat stabilizer may be present during any and/or all of the polymerization steps.

Preferred hindered phenolic antioxidants include Irganox 1010 or equivalent (i.e., tetrakis(methylene-(3,5-di-tert-butyl-4-hydroxy-hydrocinnamate))methane), Irganox 1098 or equivalent (N,N'-hexamethylene-bis(3,5-di-tert-butyl-4-hydroxy-hydrocinnamide), etc. Preferred heat stabilizers include inorganic phosphonates such as disodium hydrogen phosphonate, etc.

The presence of the antioxidant and/or heat stabilizer provides a co-barrier resin of substantially improved color and clarity characteristics. The thus prepared co-barrier resins may later be mixed with one or more of the PET or polyester resins described herein to form a resin composition having substantially improved gas barrier resistance and concurrently substantially improved color as evidenced by low yellowness index, high visible light transmittance, and color "b".

Color may be measured according to the Hunter Lab color scale: color L, color b, and color a, or the CIE color scale: color L*, color b*, and color a*.

In another embodiment, the co-barrier resin may be chemically bonded to hydroxyl-terminated or carboxyl-terminated polybutadiene for generation of a passive $CO_2$ barrier resin with an oxygen scavenger. Examples of such polybutadiene materials include poly bd R-45HTLO and poly bd R-20LM, etc. The polybutadiene may also be functionalized with maleic anhydride (for example Ricon MA, etc.) to form the specialty co-barrier resin. A co-barrier resin composition may be mixed with the polyester resin described herein to form a polyester or PET composition that may be used to form clear mono-layer containers, for example, for carbonated soft drinks.

An active oxygen barrier resin may be formed by including a material that reacts with oxygen and chemically traps the oxygen before it passes through the entire thickness of the resin or a film of the resin. Resin compositions may contain only passive $CO_2$ barrier resins or may includes resin compositions that contain both active $O_2$ barrier and passive $CO_2$ barrier resin components.

The polyester compositions of the invention which contain one or more of an inorganic or organic filler have substantially increased resistance to gas permeation in comparison to polyester compositions that contain lower amounts of an inorganic or organic filler. Mixing of the polyester compositions of the invention with one or more of the organic and/or inorganic filler permits the molding of a layer of polyester resin having substantially improved gas barrier properties, for example, blow molding.

Applicants have disclosed that the presence of the inorganic and/or organic filler in the polyester composition of the invention may lead to improvements in gas barrier resistance by providing a more difficult path for an ingressing or egressing gas to navigate. The path that a gas must follow when passing through a layer of the invention polyester compositions depends on many conditions including the conformation of the polymer and/or the presence of free-volume microstructures. Some of the characteristics of the polymer composition that may affect the gas barrier resistance includes: (e.g., thermoplastic polymer)

intra-molecular phenyl ring flipping along the polyester chain;

alignment of polymer chains after bi-axial orientation;

the free-volume fraction of organic polymers or specific resins; and the effective free-volume of the polymer blend.

In addition to the fully oriented (i.e., fully strain-hardened) properties of PET bottles, the chain conformations are believed to play the most important role in improving the gas barrier. Resins which resist or eliminate flipping of benzene or naphthalene rings because of the non-collinear attachments of their chain fragments via the functional groups of di-acids (IPA, NDA, 1,3-phenyldioxydiacetic acid, etc.), di-ols (HER, etc.), or diamines (MXDA, etc.) may exhibit substantially improved gas barrier resistance.

Major characterization methods for gas permeation of barrier bottles may include 1. $CO_2$ loss rate of carbonated bottles by FTIR;
2. Matrix and co-barrier domains by transmission electron microscopy (TEM);
3. Free-volume microstructure of organic polymers by positron beams;
4. Direct $CO_2$ or $O_2$ ingress rates of non-carbonated bottles (microliter/package/day) in a chamber filled with $CO_2$ or air;
5. Permeability of films (or thin sheets) via gas sorption by pressure decay in a dual-volume sorption cell (see e.g., "Design Considerations for Measurement of Gas Sorption in Polymers by Pressure Decay", W. J. Koros and D. R. Paul, J. Polym. Sci.-Polymer Physics Edition, 14, 1903-1907, 1976, (incorporated by reference herein in its entirety); and
6. Permeability of films (or thin sheets) via gas sorption by electrobalance In organic polymers, free volume is the void space that is available for segmental motions of organic molecules. The fractional free volume, FFV, has been defined as $FFV=(V-V_o)/V$ Here, V (total macroscopic volume) is the polymer specific volume computed from a density measurement and $V_o$ (actual molecular volume) is the specific volume occupied by the polymer chains. Direct measurement of free volume may be determined from positron annihilation lifetime (PAL) spectroscopy. PAL experiments were performed on the invention containers described herein in either un-oriented pellets or blow-molded bottles (20 oz.). Various polymer samples include PET copolymers (standard PET, PETN-10, PETN-90, etc.), nylon-based MXD6 (6001 & 6007) resins from meta-xylenediamine (MXDA) and adipic acid, PET/MXD6 blends, PET/MXIPA blends, MXDA-modified PET (MXDA-functionalized PET or polyesteramide), and so on. The MXD6 (6001) resins are produced without SSP, while the MXD6 (6007) resins are upgraded to higher IV in an SSP process. Each PAL spectrum contains 2 million counts and was analyzed into three lifetime components with corresponding intensities. The longest positron lifetime (the so-called ortho-positronium) and its intensity are used to calculate the free-volume radius and free-volume fraction. MXD6 (6001 and 6007) resins show the smallest free-volume fraction (2.4%) when compared to PET samples.

In stretch blow molding, the PET chains may align during bi-axial orientation. The presence of nylon may produce even closer chain alignment when compared to PET due to the intermolecular force of hydrogen bonding. For the bottle molded from standard PET resins, one may observe about 40% barrier improvement if one decreases the temperature of the PET chains by 12° C. from ambient temperature, for example about 25° C. Lowering the temperature of the PET chains also decreases its effective free-volume. Molecular orientation tends to increase the interfacial area of the blend. The secondary bonding (interaction) between PET and MXD6 (or MXIPA) may be stronger to reduce the chain mobility in such a way to reduce the effective free-volume of the blend.

In addition to free-volume microstructure, intra-molecular ring flipping may provide good evidence to explain the difference of $CO_2$ gas permeation rates from the inside of blow-molded bottles for carbonated soft drinks (CSD) or beers. Intra-molecular phenyl ring-flipping is possible in polymers containing para-attached phenyl rings in their backbones. PET bottle resins (standard or heat set) usually contain up to 3% IPA for various applications. A major reason of adding up to 3% IPA is for subsequent molders to produce transparent blow-molded bottles. Poly(ethylene isophthalate), PEI (100% IPA), has a much lower $CO_2$ permeability than standard PET (amorphous or crystalline). This can be considered as a consequence of differences in their dynamic conformational flexibilities. TPA-based PET (0% IPA) is able to freely flip its phenyl rings without changing its overall conformations, but PEI cannot flip its phenyl rings. The flipping of benzene rings may provide an effective diffusive pathway for gases to permeate through containers, sheets, or films. The flipping of phenyl rings is more difficult for a special group of polymers (PEI, PEN, PTN, MXD6, MXD6-IPA, HER-modified PET, etc.) with unique molecular structures because of the non-collinear attachments of functional chain segments.

TEM is a good technique to take the two-dimensional (2-D) micro-graphs of minor-phase dispersion in a continuous phase. TEM is also useful in understanding the effective dispersion (exfoliation or intercalation) of an organic-modified nano-clay in an organic polymer matrix. For incompatible PET/MXD6 blends, the MXD6 in a minor phase is usually stained with a 1% aqueous phosphotungstic acid (12 $WO_3 \cdot H_3PO_4 \cdot xH_2O$), which tags amine groups and ends. If it is necessary to stain the PET, one would use $RuO_4$ vapor, which reacts with acid ends. If the specimen was not stained, the dark lines in the TEM image are the edges of dispersed organo-clay platelets at high magnification. The platelet or laminar morphology accounts for the substantial reduction of gas permeation rates in immiscible blends.

The performance of mono-layer PET barrier bottles depends on, for example, the base resins, the degree of crystallinity, molecular orientation of pre-forms by stretching, and the resulting material distribution of bottles. PET pre-forms are generally designed to take advantage of the strong strain-hardening effect to achieve good material distribution. Intrinsic viscosity (IV) has a fairly strong effect on the strain-hardening behavior of PET. For CSD applications, injection-molded pre-forms may preferably have an IV of from 0.70 to 0.90 to produce a normal stretch for good strain hardening.

In the following examples, all barrier resins under study have same IV as a control resin. All barrier resins are molded under similar conditions as a control resin. The barrier improvement factor (BIF) is determined by a ratio of the carbonation loss rate (% per week) of a control bottle to the carbonation loss rate of a barrier bottle. The examples are provided for reference only and are not intended to limit the scope of the invention claimed in the appended claims.

Standard PET

Standard PET resins as defined in Examples 1-3 were dried to less than 50 ppm moisture prior to the injection molding, molded into 24-g pre-forms, which were then blown into 20 oz. straight wall bottles with an approximately 10-12 mil thick in side wall. The injection molding conditions were optimized to produce clear and stress-free pre-forms under a mild molding condition. The pre-forms were blown under conditions to produce a good clear bottle (free stress whitening and no haze) with appropriate material distribution. The bottles were blown at 2% over slight pearl.

EXAMPLE 1

Standard PET Resins with Low Cobalt Content

| TPA | 97% of total di-acids |
|---|---|
| IPA | 3% of total di-acids |
| EG | |
| DEG | |
| Standard additives | (Co, P, Sb) |
| | 25 ppm of elemental cobalt |
| | (106 ppm of cobalt acetate tetrahydrate) |

EXAMPLE 2

Standard PET Resins with High Cobalt Content

| TPA | 97% of total di-acids |
|---|---|
| IPA | 3% of total di-acids |
| EG | |
| DEG | |
| Standard additives | (Co, P, Sb) |
| | 80-100 ppm of elemental cobalt |
| | (338-410 ppm of cobalt acetate tetrahydrate) |

EXAMPLE 3

Standard PET Resins with Negligible Cobalt Content

| TPA | 97% of total di-acids |
|---|---|
| IPA | 3% of total di-acids |
| EG | |
| DEG | |
| Standard additives | (P, Sb, organic toners) |

The FTIR method (U.S. Pat. No. 5,473,161—incorporated by reference herein in its entirety) for carbonation loss is designed to accurately assess the $CO_2$ loss rate of a plastic bottle and to extrapolate its shelf-life at 17.5% carbonation loss. The amount of $CO_2$ is evaluated using an infrared light beam in a sample size of 12 test bottles over a 49-day period for non-refillable plastic bottles. From the $CO_2$ loss rate as determined by FTIR testing, a shelf life can then be accurately calculated. For 24 g/20 oz. bottles from standard PET resins, the $CO_2$ loss rate was determined as $$y = 1.58 \text{ (\% loss per week)} x + 2.02$$

The resulting shelf life was calculated for each of Examples 1-3 as 9.8 weeks at 17.5% $CO_2$ loss. The resins of Examples 1-3 were molded into preforms (24 g) and bottles (24 g & 20 oz.) and the bottles showed a similar carbonation loss rate (i.e., 1.58% loss per week after a 49-day period).

In a continuous melt poly-condensation process for PET bottle resins, the cobalt acetate tetrahydrate, an inorganic compound, has been routinely used as a toner to mask the potential yellowness in the resulting chips. The elemental cobalt metal is neither a polymerization catalyst nor a gas barrier promoter. Appropriate organic toners such as blue/red can be utilized to replace the elemental cobalt from cobalt acetate tetrahydrate.

MXDA-Based Polyamides as a Co-barrier

Non-oriented PET and non-oriented MXD6 have a refractive index of approximately 1.58 in all directions (x, y, & z). After bi-axial orientation, PET and MXD6 have different values of refractive index. PET has a refractive index higher than MXD6 in the x, y directions over a planar draw ratio of 10-16. On the other hand, MXD6 has a refractive index higher than PET in the z direction over a planar draw ratio of 10-16. Therefore, PET has a degree of orientation, $(n_x + n_y)/2 - n_z$, about 4 to 5 times higher than MXD6 over a planar draw ratio of 10-16. For a standard PET bottle, the axial stretch ratio (2-3) is defined as bottle length/pre-form length (stretching portions only) and the loop stretch ratio (3-5) is defined as bottle diameter/inside pre-form diameter). The resulting planar stretch ratio is around 12-14. The bottles in carbonated soft drinks (CSD) have the stretch ratios slightly higher than those in hot fill applications. The molded-in stresses and maximum strain hardening improve the container performance.

The visible haze in the PET/MXD6 blend bottles is mainly caused by the difference of refractive index (RI) between PET and MXD6. The use of lower viscosity MXD6 in a physical blend with PET can reduce the haze to some extent. To further reduce the haze and improve the minor-phase dispersion, a special polyamide was prepared by direct poly-condensation of a di-amine component such as 1,3-metaxylenediamine (MXDA) and a di-carboxylic acid component such as adipic acid, isophthalic acid, phthalic anhydride, etc.

Figure 5:
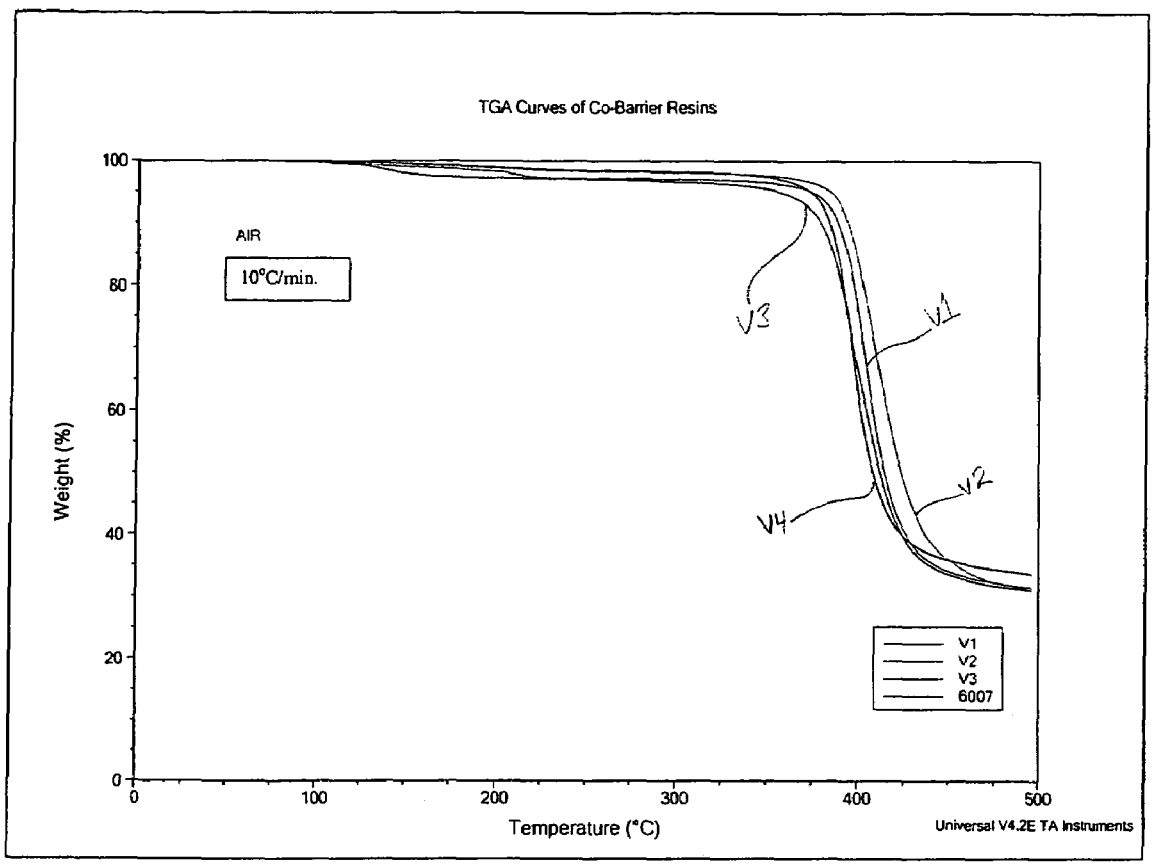
FIG. 5 is a chart of the TGA curves of co-barrier resins.

The thermal stability of four samples of co-barrier resins (i.e., co-barrier resins v1, v2, v3 and 6007 of Table 1) was determined by Thermal Gravimetric Analysis (TGA). The analysis was carried out while heating the samples at a rate of 10° C./min in air as a means of detecting thermal and oxidative degradation. Initially the co-barrier barrier resins are observed to undergo a loss of weight at above 100° C. which corresponds with the loss of about 5% by weight in moisture. A substantial change in the sample weight occurs at around 375° C. indicating the onset of thermal degradation. The TGA curves for each sample are shown in FIG. 5.

TABLE 1

IPA/MXDA-Functionalized Passive/Active Co-barrier Resins

| | Molar Compositions | | | | | Physical Properties | | | | Thermal Properties | | |
|---|---|---|---|---|---|---|---|---|---|---|---|---|
| Batch | IPA (mol) | Adipic Acid (mol) | MXDA (mol) | Oxygen Scavenger (wt. %) | Antioxidants and Heat Stabilizers | IV | Color L | Color b | $S_g$ | $T_g$ (° C.) | $T_c$ @ Peak (° C.) | $T_m$ @ Peak (° C.) |
| 6001-MXD6(pellets) | 0 | | 50 | 50 | | 0.878 | 89.59 | 10.06 | 1.22 | 85 | 156 | 239 |
| 6007-MXD6(pellets) | 0 | | 50 | 50 | | 1.119 | 88.51 | 4.54 | | 85 | 159 | 237 |
| v2-MXD6(granules) | 0 | | 50 | 50 | None | 0.423 | 79.95 | 11.45 | | 82 | 139 | 233 |
| 1(granules) | 50 | | 0 | 50 | None | | | | | 165 | | |
| 2(granules) | 35 | | 15 | 50 | None | | 66.84 | 16.43 | | | | |
| 3(granules) | 25 | | 25 | 50 | Irganox B 1171 (0.1 wt. %) | 0.45 | 71.82 | 11.86 | | 130 | | |
| 4(granules) | 15 | | 35 | 50 | Water (10 wt. %) | | | | | | | |
| 5(granules) | 15 | | 35 | 50 | Irganox 1098 (0.1 wt. %) | | | | | | | |
| v3(granules) | 10 | | 40 | 50 | Irganox B 1171 (0.15 wt. %) | 0.314 | 75.30 | 10.32 | | 93 | | |
| v1(granules) | 5 | | 45 | 50 | Irganox B 1171 (0.15 wt. %) | 0.814 | | | | 93 | 175 | 221 |
| v11(granules) | 5* | | 45 | 50 | Irganox 1010 (0.1 wt. %) & BRUGGOLEN H 10 (0.1 wt. %) | 0.45 | | | | | | |
| v21(granules) | | | 50 | 50 | 1+ | Irganox 1010 (0.1 wt. %) & BRUGGOLEN H 10 (0.1 wt. %) | 0.45 | | | | | | |

Notes:
*Specialty IPA co-monomers such as 5-(sodiosulfo)-isophthalic acid (5-Na$^+$SO$_3^-$-IPA) or 5-(lithiosulfo)-isophthalic acid (5-Li$^+$SO$_3^-$-IPA) were used for making MXDA-adipic acid-IPA ionomers.
+Hydroxyl-terminated, carboxyl-terminated, or maleic anhydride functionalized polybutadiene resins (poly bd R-45HTLO, poly bd R-20LM, Ricon MA, etc.) were chemically bonded to MXD6.

EXAMPLE 4

In Example 4, MXD6 (6001) pellets (no SSP) were obtained from Mitsubishi Gas Chemical and used as a co-barrier.

| Matrix resin: PET domains | |
|---|---|
| TPA | 95% of total di-acids |
| IPA | 4-5% of total di-acids |
| 5-Na$^+$SO$_3^-$-IPA or 5-Li$^+$SO$_3^-$-IPA | 0-1% of total di-acids |
| EG | |
| DEG | |
| Standard additives | (Co, P, Sb) |
| Co-barrier: 6001 domains | 3 wt. % or 5 wt. % based on PET domains |

For the bottles molded from PET/6001 dry blends, the $CO_2$ loss rate, shelf life, and barrier improvement factor when compared to a standard PET bottle (24 g/20 oz.) were determined as PET/6001 (95/5) blend bottle (24 g/20 oz.)
    y=0.92 (% loss per week) x+2.12
    a shelf life of 16.7 weeks at 17.5% $CO_2$ loss
    1.72× better $CO_2$ barrier than the $CO_2$ loss rate of the PET compositions of Examples 1-3.

PET/6001 (97/3) blend bottle (24 g/20 oz.)
    y=1.11 (% loss per week) x+2.00
    a shelf life of 14 weeks at 17.5% $CO_2$ loss
    1.42× better $CO_2$ barrier than the $CO_2$ loss rate of the PET compositions of Examples 1-3.

PET/6001 (97/3) blend bottle (28 g/20 oz.)
    y=0.87 (% loss per week) x+2.38
    a shelf life of 17.4 weeks at 17.5% $CO_2$ loss
    1.82× better $CO_2$ barrier than the $CO_2$ loss rate of the PET compositions of Examples 1-3.

In addition, two PET/6001 (97/3) blend bottles (28 g/20 oz.) were tested for an oxygen ingress rate of 0.019 cc/package/day or 19 micro-liters/package/day. Thus, the PET compositions of the made without SSP can have substantially improved $O_2$ barrier when compared to a standard PET bottle (28 g/20 oz.). FIG. 3 show a TEM 2D micro-graph @ 34,000× of such a PET/6001 (97/3) blend. The 6001 resins are the dark circular domains in the pre-form and dark line domains in the bottle.

EXAMPLE 5

In Example 5, MX-IPA granules were made in a 6-gal reactor. Into a 6-gal reactor vessel, were charged 4.937 kg of MXDA, 4.238 kg of adipic acid (80 mole % of the acid component), 1.208 kg of IPA (20 mole % of the acid component), 13.6 g of Irganox B 1171 (0.15 wt. % relative to neat resins). 9 mg of organic blue toner (1 ppm relative to neat resins), and 4.5 mg of organic red toner (0.5 ppm relative to neat resins) may be added to lower the value of color b. Prior to heating up the reaction mixture, the air was removed from the reactor. The reaction was carried out under an atmosphere of nitrogen. The reaction mixture was heated to 195° C. and the adipic acid was uniformly melted at 160° C. The agitator was then started. The temperature of the reaction mixture was continuously raised to 238° C. and the reaction had continued for another 1-3 hours. At the end of this batch, the molten material was rapidly quenched in the water.

| Matrix resin: PET domains | |
|---|---|
| TPA | 95% of total di-acids |
| IPA | 4-5% of total di-acids |
| 5-Na$^+$SO$_3^-$-IPA or 5-Li$^+$SO$_3^-$-IPA | 0-1% of total di-acids |
| EG | |
| DEG | |
| Standard additives | (Co, P, Sb) |
| Co-barrier: MX-IPA domains | 5 wt. % based on PET domains |

The PET/MX-IPA blend bottles (24 g/20 oz.) were molded and tested.

EXAMPLE 6

Another co-barrier resin was made in the same reaction vessel as in Example 5 was charged with 4.977 kg (36.6 mol) of MXDA, 4.807 kg (32.9 mol) of adipic acid (90 mole % of the acid component), 0.610 kg (3.7 mol) of IPA (10 mole % of the acid component), and 13.6 g of Irganox B 1171. Prior to heating up the reaction mixture, the air was removed from the reactor. The reaction was carried out under an atmosphere of nitrogen. The reaction mixture was heated to 195° C. and the adipic acid was uniformly melted at 160° C. The agitator was then started. The temperature of the reaction mixture was continuously raised to 238° C. and the reaction had continued for another 1-3 hours. At the end of this batch, the molten material was rapidly quenched in the water.

EXAMPLE 7

The recipe according to Example 6 was scaled up in a larger reactor. Into a 175-gal reactor vessel, were charged 153.2 lb (69.552 kg or 511 mol) of MXDA, 148 lb (67.192 kg or 460 mol) of adipic acid (90 mole % of the acid component), 18.6 lb (8.444 kg or 51 mol) of EPA (10 mole % of the acid component), and 200 grams of Irganox B 1171 (0.15 wt. % relative to neat resins). Both adipic acid and isophthalic acid were first fed into the reactor. Prior to heating up the di-acid mixture, the air was removed from the reactor. The reaction was carried out under an atmosphere of nitrogen. The reaction mixture was heated to 195° C. and the adipic acid was uniformly melted at 160° C. The agitator was then started. The liquid MXDA monomer was then continuously added into the di-acid mixture in a small rate. During the addition of MXDA, the reaction temperature was continuously raised to 238° C. and the reaction was continued for another 1-3 hours after final addition of MXDA. At the end of the batch, the discharge valve at the bottom of the reactor was opened for particle formation (granulation or pelletization).

IPA-only as a Barrier Component

High IPA chips may be produced via a continuous melt-phase esterification/poly-condensation process. The molten materials may have an IV of 0.5-0.6 or the molten resins continue to be upgraded to a target IV of 0.70-0.90 or higher depending on end applications. Hot cutting the resin and crystallization can be completed in one or more steps. Another alternative is to perform cold, wet cutting of the strands, followed by an external crystallizer. A product cooler was used prior to a silo. Hi-IPA resin having from 10-30 mol % of IPA can be handled in this manner with 70-90 mol % IPA.

EXAMPLE 8

IPA-modified PET resins have the advantage of excellent clarity in blow-molded bottles. To achieve a certain level of barrier improvement factor (BIF), much higher IPA content is needed. In a commercial solid-state poly-condensation (SSP) process unit, the molecular weight or intrinsic viscosity (IV) of crystallized chips is commonly upgraded in a gravity-flow reactor. One can see fewer sticking problems if the chips contain up to 5% IPA at a given temperature and throughput.

| | |
|---|---|
| TPA | 80-90% of total di-acids |
| IPA | 10-20 of total di-acids |
| 5-Na$^+$SO$_3^-$-IPA or 5-Li$^+$SO$_3^-$-IPA | optionally 0-1% of total di-acids |
| EG | |
| DEG | |
| Standard additives | (Co, P, Sb) |
| Nucleating agent | PEN/PTT, MXD6, MX-IPA, etc. |

Organoclay Nanoplatelets as a Co-barrier

Experience tells that organic-modified clay nano-platelets will not be easily peeled off in a PET matrix. These organo-clay nano-platelets show, however, effective dispersion in an MXD6 or MX-IPA (IPA-modified MXD6) matrix. The resulting nano-composites will be then used as a co-barrier in a PET matrix. MXD6 resins are commercially available in three product grades (6001, 6007, and 6121) from Mitsubishi Gas Chemical. The melt viscosity increases from 6001 (lowest) to 6121 (highest) at a given temperature. All of these three grades can be processed at temperatures of 250-290° C. Southern Clay Products, Inc. sells Cloisite® organo-clays. The compounding and re-pelletization of two Cloisite® organo-clays (30B & 93A) with 6007 pellets were carried out in a co-rotating, twin-screw extruder (1-inch, ZE 25, 40 L/D, screw # 850-1).

The first batch (DAK-8) involves 4 wt. % Cloisite 93A in a 6007 resin matrix and the resulting pellets are not clear. The second batch (DAK-9) deals with 4 wt. % Cloisite 30B in a 6007 resin matrix and the resulting pellets are transparent. Cloisite 30B is similar to one organo-clay (Nanomer) from Nanocor.

EXAMPLE 9

| Matrix resin: PET domains | |
|---|---|
| TPA | 95% of total di-acids |
| IPA | 4-5% of total di-acids |
| 5-Na$^+$SO$_3^-$-IPA or 5-Li$^+$SO$_3^-$-IPA | 0-1% of total di-acids |
| EG | |
| DEG | |
| Standard additives | (Co, P, Sb) |
| Co-barrier: DAK-9 domains | 5 wt. % based on PET domains |

EXAMPLE 10

| Matrix resin: PET domains | |
|---|---|
| TPA | 95% of total di-acids |
| IPA | 5% of total di-acids |
| EG | |
| DEG | |
| Standard additives | (Co, P, Sb) |
| Co-barrier: PEN/PTT | 5 wt. %/5 wt. % based on PET domains |

EXAMPLE 11

| Matrix resin: PET domains | |
|---|---|
| TPA | 90% of total di-acids |
| IPA | 9-10% of total di-acids |
| 5-Na$^+$SO$_3^-$-IPA or 5-Li$^+$SO$_3^-$-IPA | 0-1% of total di-acids |
| EG | |
| DEG | |
| Standard additives | (Co, P, Sb) |
| Co-barrier: MX-IPA domains | 5 wt. % based on PET domains |

Specialty Polyesteramides

High barrier polyesters such as PGA, PTN, PEI, PEN, etc. tend to undergo rapid trans-esterification with PET in the molten state. Because of substantial change in chain conformations, the gas barrier may be improved to some extent. With modification by a small portion of MXDA, the resulting amide-functionalized PET chains show some unique advantages such as better chain conformation, closer chain alignment after orientation, lower free volume, and so on. Typical MXDA-modified polyesters may include MXDA-modified polyglycolic acid (PGA), MXDA-modified PTN, MXDA-modified PEI, MXDA-modified PEN, etc. The PET chains built with some MXDA (MXDA-modified PET) have one polymer phase and the resulting bottles are clear without haze. The MXDA-modified PET may provide better $CO_2$ barrier than PET/co-barrier blends, which have two polymer phases (cobarrier exfoliated in PET) and often exhibit birefringence (double refraction) of light in a transparent, molecularly ordered material. See Example 12 for MXDA-modified PET.

EXAMPLE 12

Figure 4:
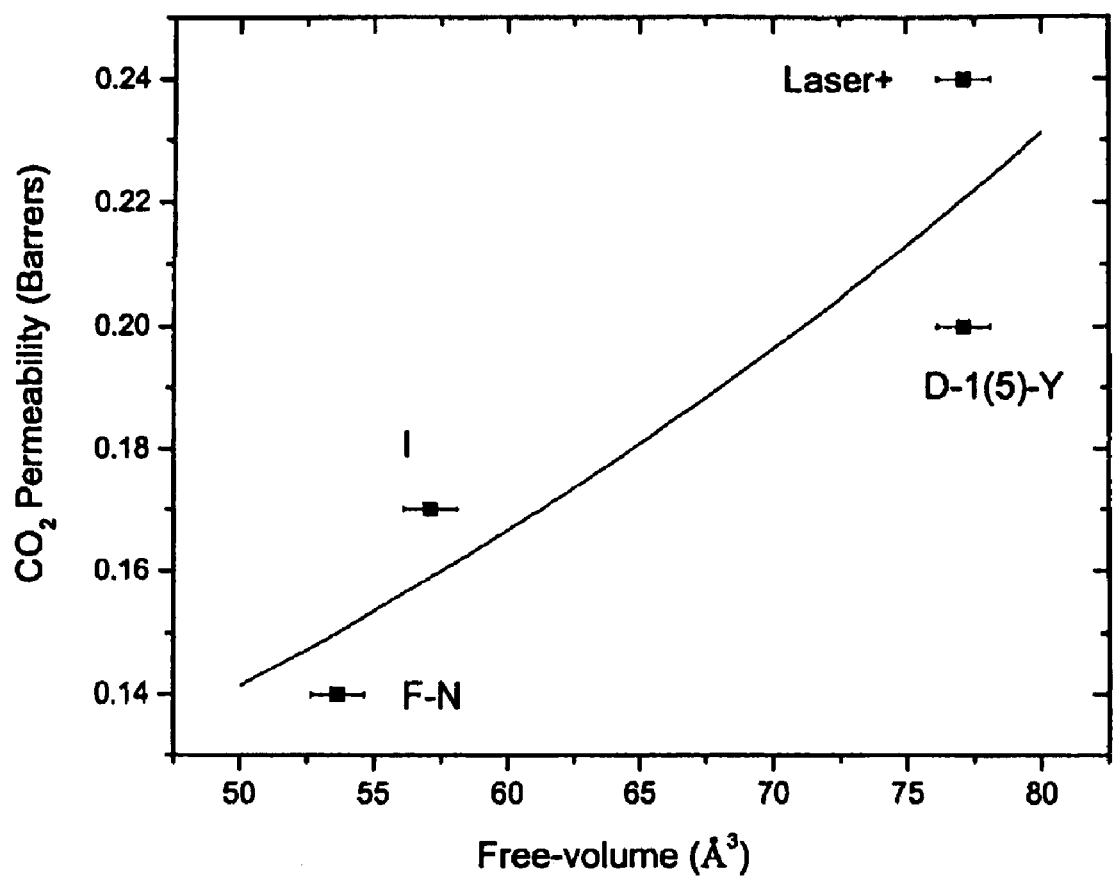
FIG. 4 shows the relationship of carbon dioxide permeability and the free volume of various resins.

Another barrier resin (F—N; an MXDA-modified PET) was made in a 15-gal reactor. The initial agitation speed was set at 52 rpm. Into a reaction vessel, were charged 2.27 kg of MXDA, 17.1 kg of EG, 37 kg of TPA, and 1.15 kg of IPA. Standard PET additives include 219 ppm of elemental antimony, 29 ppm of elemental cobalt, 29 ppm of elemental phosphorus, and 0.62 ppm of carbon black. After purging with nitrogen, the reactor was pressurized to 276 kPa (40 psi) with nitrogen. The initial slurry temperature was at 110° C. The melt temperature set point was adjusted to 260° C. The pressure esterification had continued at 260° C. for 200-250 minutes. The reactor was vented to atmospheric pressure at a rate of 55 kPa per minute. The melt temperature set point was increased to 263° C. The atmospheric esterification had continued at 263° C. for about one hour. The phosphoric acid was charged with an additional EG and the poly-condensation was started. The melt temperature set point was increased to 274° C. and the reactor pressure was decreased from atmosphere to 700 mm Hg. The pressure was again decreased to 75 mm Hg at a rate of 25 mm Hg per minute. The melt temperature set point was increased to 279° C. As soon as the reactor pressure was 75 mm Hg, the pressure was gradually decreased to below 1 mm Hg. The melt temperature set point was increased to 285° C. The agitation speed was reduced to 45 rpm, 40 rpm, and 35 rpm as the poly-condensation reaction proceeds. The heat transfer system was set for manual temperature control. The agitation speed was again reduced to 30 rpm, 25 rpm, and 20 rpm until a final torque of 1,600 in-lb$_f$ was targeted. The poly-condensation had continued at 274-285° C. for 150-180 minutes. The agitation speed was then reduced to the slowest speed. The vacuum was relieved with nitrogen and the product extrusion was initiated. The melt was clear during pressure esterification and the resulting pellets were clear The amorphous chips (F-N; an MXDA-modified PET) had 0.467 IV and were upgraded to 0.758 IV via SSP. The resin had a glass transition temperature of 84° C., a crystallization temperature of 166° C. @peak, and a melt temperature of 235° C. @ peak. The resin was molded into 24 g/20 oz. bottles. After injection molding the solution IV of the performs was less than 0.6 and not high enough and one could not see strong strain-hardening behavior (good material distribution) during stretch blow molding. A sheeting sample was cut from a 24 g/20 oz. bottle for measurement of free-volume microstructure by positron beams and measurement of gas sorption by pressure decay, respectively. The $CO_2$ sorption by pressure decay showed a diffusion coefficient of $8.48 \times 10^{-10}$ cm$^2$/s, a sorption coefficient of 0.0168 cm$^3$ (STP)/(cm$^3$ (polymer)-cmHg), and a permeability coefficient of 0.14 Barrers [1 Barrer=$10^{-10}$ (cm$^3$-cm)/(cm$^2$-s-cmHg)] at 35° C. & 58 psia. FIG. 4 showed the relationship of $CO_2$ permeability and free volume using the resin (F-N; an MXDA-modified PET), one control resin (Laser+), and two other co-barrier resins (I & D-1(5)-Y).

Obviously, numerous modifications and variations of the present invention are possible in light of the above teachings. It is therefore to be understood that within the scope of the appended claims, the invention may be practiced otherwise than as specifically described herein.

The invention claimed is:

1. A composition, comprising:
a polymer blend comprising at least one polyester matrix resin, and at least one co-barrier resin;
wherein the polyester resin has an intrinsic viscosity of from 0.7 to 0.9 at 30° C. in a mixed solvent of 60% phenol and 40% 1,1,2,2-tetrachloroethane, wherein % is wt % based on the total weight of phenol and 1,1,2,2-tetrachloroethane and is obtained by melt polymerizing a mixture comprising one or more dicarboxylic acids and one or more diols; and
wherein the co-barrier resin is one or more of a polyamide resin, a co-polyamide resin, a co-polyamide ionomer, an amide-functionalized polyester resin, and a resin having non-linear attachment to one or more of a benzene and a naphthalene ring present therein, comprising reacted units of adipic acid, isophthalic acid, and meta-xylene diamine.

2. The composition of claim 1, wherein the co-barrier resin comprises a resin having non-linear attachment through at least one of a 1,2- and a 1,3-functional group present on one or more of a benzene ring and a naphthalene ring present in the co-barrier resin.

3. The composition of claim 1, wherein the polyester matrix resin comprises reacted units of terephthalic acid and ethylene glycol.

4. The composition of claim 1, wherein the polyester matrix resin comprises reacted units of terephthalic acid and isophthalic acid; and the isophthalic acid is present in the polyester resin in an amount of up to 10 mol % based upon the total number of moles of dicarboxylic acid in the polyester resin.

5. The composition of claim 4, wherein the polyester matrix resin is obtained by polymerizing the mixture without solid state polymerization.

6. The composition of claim 1, wherein the polyester matrix resin comprises a first resin comprising at least reacted units of terephthalic acid and a diol, and a second resin comprising reacted units of terephthalic acid, isophthalic acid and a diol.

7. A container obtained by blow molding an injection-molded pre-form comprising the composition of claim 1.

8. The container of claim 7, having a wall thickness of 10-12 mils and a barrier improvement factor of 1.5 times or more when compared to a container formed from PET formed with solid state polymerization.

9. The composition of claim 1, wherein the polyester matrix resin is functionalized by at least one of 5-Na$^+$SO$_3^-$-isophthalic acid and 5-Li$^+$SO$_3^-$-isophthalic acid or the polyester matrix resin is amide-functionalized.

10. The composition of claim 1, wherein at least one of the polymer matrix resin and the co-barrier resin comprise a resin having non-linear attachment of at least one of a 1,2- and a 1,3-functional group to one or more of a benzene ring and a naphthalene ring present in the resin.

11. A container obtained by thermoforming a sheet comprising the composition of claim 1.

12. The composition of claim 1, wherein the co-barrier resin comprises 5% by mol or less of reacted isophthalic acid units.

13. The composition of claim 1, wherein the co-barrier resin comprises less than 10 mol % of reacted units of isophthalic acid.

14. The composition of claim 1, wherein the co-barrier resin consists of reacted units of adipic acid, isophthalic acid, and meta-xylene diamine.

15. The composition of claim 1, wherein the co-barrier resin is present in an amount of from 2 to 18% by weight based on the total weight of the polyester matrix resin and the co-barrier resin.

16. The composition of claim 1, wherein the co-barrier resin is present in an amount of from 1 to 5% by weight based upon the total weight of the co-barrier resin and the polyester matrix resin.

17. A mono-layer carbonated beverage container in the form of a bottle, comprising:
a mono-layer film comprising the composition of claim 1.

* * * * *